May 5, 1970   D. TEODORESCU   3,510,730
ELECTROMAGNETIC ACTUATOR
Filed July 26, 1968   3 Sheets-Sheet 3

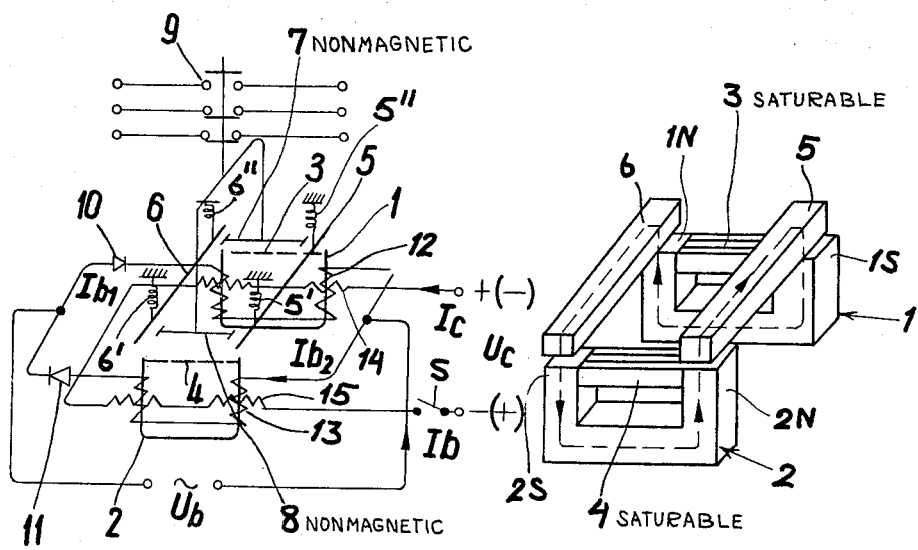
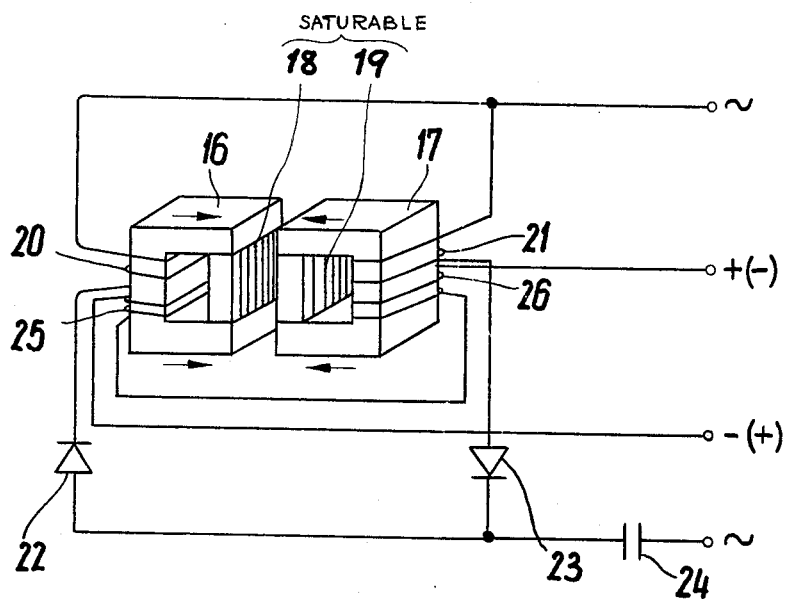

Dan Teodorescu
Inventor.

By Karl F. Ross
Attorney

United States Patent Office 3,510,730
Patented May 5, 1970

3,510,730
ELECTROMAGNETIC ACTUATOR
Dan Teodorescu, Strada Trandafirilor 2,
Timisoara, Rumania
Filed Jan. 26, 1968, Ser. No. 700,949
Claims priority, application Rumania, Jan. 28, 1967,
52,976
Int. Cl. H01h 47/00
U.S. Cl. 317—137                                    10 Claims

ABSTRACT OF THE DISCLOSURE

Two electromagnets with working and control windings on their U-shaped cores are magnetically short-circuited by respective bridge pieces of saturable ferromagnetic material; these cores form part of a substantially closed magnetic circuit with one or more airgaps which may also include two armature members extending between opposite poles of the two cores. The working windings are alternately energized by unipolar current pulses supplied via respective rectifiers from a common source of alternating current; a direct current traversing the control windings modulates the amplitude of these current pulses and, when of the proper polarity, drives the bridge pieces to saturation whereby the short circuit becomes ineffectual and the flux traverses the airgaps to attract the armature members onto the electromagnetic poles or to draw the two cores toward each other. A condenser in series with the A-C source substantially resonates the working windings under saturating conditions so as to bring about a sharp rise in working current in response to a relatively small control-current increment, thereby increasing the flux available for narrowing the airgaps.

---

My present invention relates to an electromagnetic control element or actuator designed to respond to an electric signal for performing a desired function by the displacement of a movable load member.

The general object of this invention is to provide an electromagnetic actuator of high sensitivity and favorable force/airgap ratio.

In accordance with this invention I provide a plurality of magnetizable members which are relatively movable under mutual magnetic attraction and which include the generally U-shaped cores of a pair of horseshoe-type electromagnets. These cores may themselves be relatively movable, or else they may be stationary and co-operate with an armature also included among the aforementioned magnetizable members. In either event, according to an important feature of my invention, the spaced-apart poles of each core are spanned by a saturable bridge piece forming a magnetic short circuit thereacross as long as the energization of the core winding or windings remains below the saturation level. When, however, this level is exceeded, the short circuit is rendered ineffectual and the generated flux traverses the airgap or airgaps initially present between the cores, or between either core and an associated armature, to attract the cores toward each other or the armature unto one or both cores. For this purpose, an operating current traversing the core windings may be amplitude-modulated by the superimposition of a relatively small control current so as to generate either a non-saturating or a saturating flux, depending upon the polarity of the control current. Thus, in a system utilizing the self-saturation phenomenon of magnetic amplifiers, the operating current is delivered to a pair of working windings by an A-C power source in the form of unipolar pulses through a pair of oppositely poled diodes acting as resistive demodulators.

In accordance with another feature of my invention, a capacitance in the form of one or more condensers may be connected in series with the demodulating diodes, this capacitance being so dimensioned as substantially to resonate the working windings upon saturation of the associated bridge pieces whereby a relatively small increment in control voltage results in a relatively steep rise of the working current and, thus, in a greatly increased flux across the airgap or airgaps.

With the electromagnetic cores constituted in conventional manner of laminated ferromagnetic material, the bridge pieces may be made of similar laminae interspersed with other laminae or foils of more readily saturable material.

The invention will be described in greater detail with reference to the accompanying drawing in which:

FIG. 1 is a diagrammatic illustration of an electromagnetic actuator embodying the invention;

FIG. 2 is a perspective view of the magnetizable elements of the actuator shown in FIG. 1;

FIG. 3 is a partly perspective, partly diagrammatic view of a modified actuator according to the invention;

Figure 4:
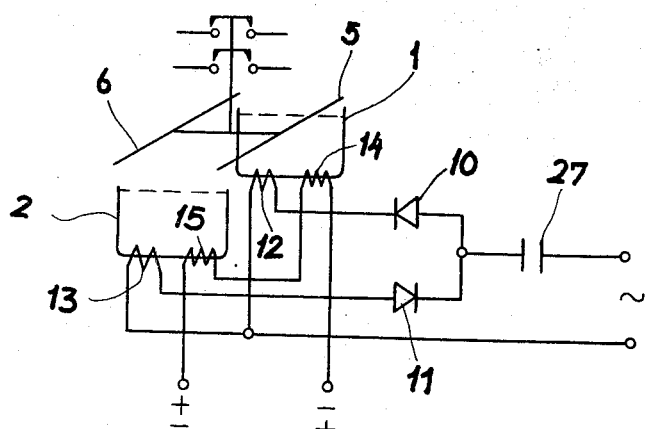
Figures 5, 6:
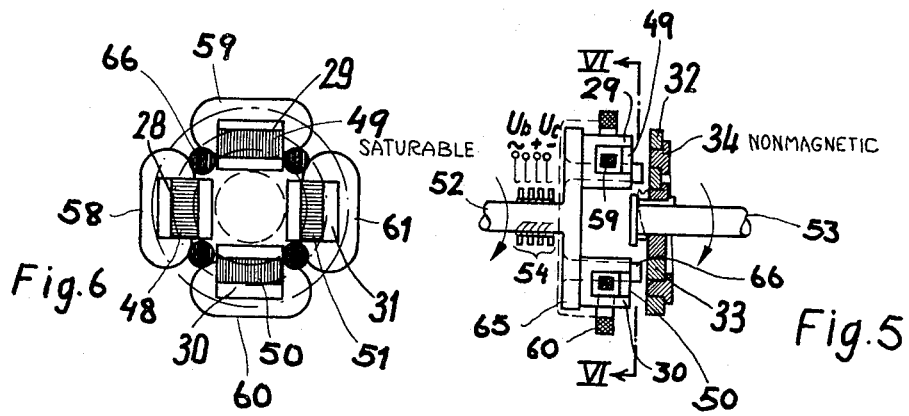
Figures 7, 8:
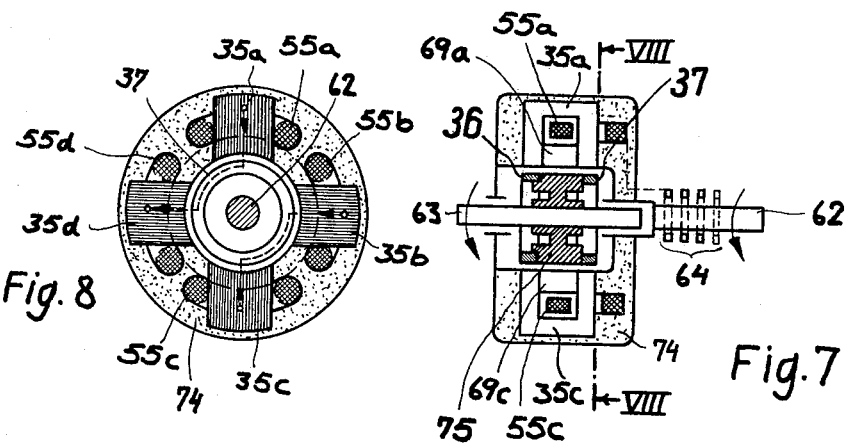
Figure 9:
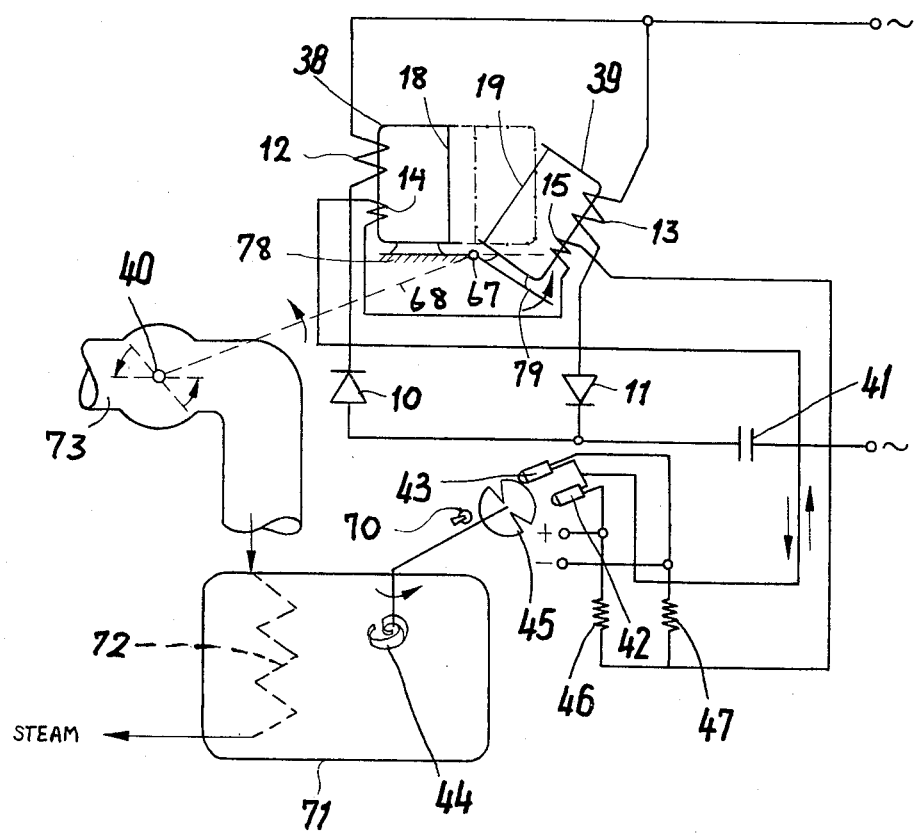
Figure 10:
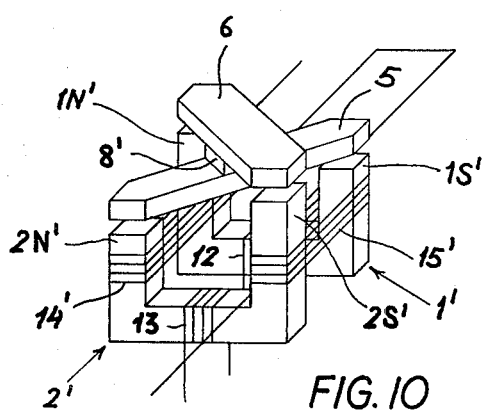

FIG. 4 diagrammatically illustrates a variant of the system of FIG. 1;

FIG. 5 is a side view, partly in axial cross-section, of an electromagnetic clutch embodying the principles disclosed in connection with FIGS. 1–4;

FIG. 6 is a transverse view taken on the line VI—VI of FIG. 5;

FIG. 7 is a view similar to FIG. 5, showing an alternate clutch according to the invention;

FIG. 8 is a cross-sectional view taken on the line VIII—VIII of FIG. 7;

FIG. 9 is a diagrammatic view of still another electromagnetic actuator according to the invention; and FIG. 10 is a view similar to FIG. 2, illustrating a further modification.

The electromagnetic actuator shown in FIGS. 1 and 2 comprises a pair of generally U-shaped magnetizable members or yokes 1 and 2 constituting the cores of two electromagnets with working windings 12, 13 and control windings 14, 15. The working windings 12, 13 are so connected across a source of alternating voltage $U_b$, in series with respective half-wave rectifiers 10 and 11, as to be alternately traversed by current from that source; the windings are so oriented that opposite poles 1N, 2S and 1S, 2N of the two cores confront each other, these confronting poles being bridged by respective armature members 5 and 6 normally spaced therefrom by four airgaps. Thus, a magnetic circuit is seen to exist which can be traced from pole 1N of core 1 through armature members 6, poles 2S of core 2, pole 2N thereof and thence through armature member 5 to pole 1S of core 1. This magnetic circuit, however, is shunted by a pair of bridge pieces 3 and 4 which span the poles 1S, 1N and 2S, 2N, respectively, of cores 1 and 2. Bridge pieces 3 and 4 are more readily saturable than the cores 1 and 2, yet in the illustrated unoperated position the components $Ib_1$, $Ib_2$ of the current $I_b$ traversing windings 12 and 13 are of such magnitude that the resulting flux does not saturate these bridge pieces so as to circulate virtually exclusively in two closed paths 1, 3 and 2, 4 without substantially affecting the armature members 5 and 6. These members are physically interconnected by a pair of nonmagnetic links 7, 8 forming part of a structure which actuates a set of contacts 9 of a controlled switch. Springs 5', 5" and 6', 6" tend to keep the armatures 5 and 6 away from the cores 1, 2 and in contact with a fixed stop not shown.

A source of unidirectional control voltage $U_c$ is connectable by a switch S (representative of any mechanical or electronic voltage-control means) in series with windings 14 and 15 so as to create therein a current flow $I_c$ which modulates the amplitude of the pulsating working current $I_b$ flowing through the associated windings 12 and 13. In the presence of a control current of the proper ("aiding") polarity, the flux generated in the cores 1 and 2 at the peaks of the working current exceeds the saturation level of these bridge pieces and passes across the intervening airgaps into armature members 5 and 6 along the circuit previously traced. The mobile structure 5–8 is thus strongly attracted toward the cores 1 and 2, against the force of their restoring springs 5', 5'', 6', 6'', to actuate the switch contacts 9. It will be appreciated that a similar effect could be obtained by letting the unmodulated working current $I_b$ generate a flux exceeding the saturation level of bridge pieces 3 and 4 and by reversing the polarity of the control current $I_c$ as parenthetically indicated in FIG. 1. Thus, the amplitude modulation of the working current required to attract the armature can be produced either by closing or by opening the circuit through control windings 14 and 15, either operation involving only a relatively small control current $I_c$.

In FIG. 3 I have shown a pair of yokes 16, 17 with saturable bridge pieces 18, 19, working windings 20, 21 and control windings 25, 26, the magnetic-amplifier circuit including a pair of oppositely poled diodes 22, 23 connected in parallel with each other and in series with a condenser 24. The capacitance of this condenser is so chosen as substantially to resonate the windings 20, 21 when the effective inductance of these windings is reduced by saturation of the short-circuiting bridge pieces 18, 19. As a result, the desired depth of modulation may be achieved by the flow of a relatively small control current of aiding polarity or the interruption of a similarly small control current of opposing polarity through application or removal of a very low control voltage to or from the common terminals of windings 25, 26.

The system of FIG. 3 further differs from that of FIGS. 1 and 2 by the omission of the mobile armature members 5 and 6, either or both cores 16 and 17 being instead movably positioned so that the cores may approach each other under operating conditions as indicated by the arrow; the movable core or cores may be under the control of a suitable restraining means, not shown, and may serve to actuate a set of contacts or any other appropriate load.

FIG. 4 illustrates the system of FIGS. 1 and 2 with the addition of a condenser 27 in series with rectifiers 10 and 11, this condenser having the same function as the capacitor 24 of FIG. 3.

FIGS. 5 and 6 illustrate the application of the present invention to a rotary clutch. Two coaxial shafts 52 and 53, one of which may be driven, are to be coupled for joint rotation or mutually decoupled in response to a control voltage $U_c$ applied, together with an alternating operation voltage $U_b$, to a set of slip rings 54 carried on shaft 52. This shaft also supports, on a disk 62, a set of four electromagnetic cores 28, 29, 30, 31 spaced 90° apart and spanned, as in the preceding embodiments, by respective bridge pieces 48, 49, 50, 51 of saturable material. These cores are also provided with respective windings 58, 59, 60, 61 which may be subdivided to receive working and control currents from slip rings 54. The poles of the cores are disposed along two concentric circles confronting a pair of annular ferromagnetic armatures 32, 33 which are rigid with shaft 53 and separated by an annular nonmagnetic spacer 34. A set of elastic bumpers 66, carried by a disk 65, project toward the disk structure 32–34, keyed to shaft 53 for axial motion therealong, so as to make frictional contact therewith upon energization (or deenergization) of the control circuit to exceed the saturation level of bridge pieces 48–51.

FIGS. 7 and 8 show a generally similar clutch with cores 35a, 35b, 35c, 35d having their poles oriented toward the axis of a supporting shaft 62, this shaft carrying slip rings 64 for the energization of working and control windings 55a, 55b, 55c, 55d. A shaft 63 coaxial with shaft 62 is rigid with an armature split into two axially separated ferromagnetic rings 36 and 37 supported by a nonmagnetic body 75. The cores 35a–35d are imbeded, except for their poles, in a shell 74 of magnetic powder. The poles are again short-circuited by respective bridge pieces, two of which have been shown at 69a and 69c.

In operation, the generation of a supersaturing flux in cores 35a–35d tends to immobilize the armature 36, 37, 75 with reference to shell 74 whereby the shafts 62 and 63 are coupled for joint rotation. The flux then threading the rings 36, 37 has been indicated by broken lines in FIG. 8.

The system of FIG. 9 comprises a pair of relatively movable cores 38, 39 generally similar to the yokes 16 and 17 of FIG. 3, with saturable bridge pieces 18 and 19, working windings 12, 13 in series with respective diodes 10, 11 and a common resonating condenser 41, and control windings 14, 15. Core 38 is shown fixed to a base 78 whereas core 39 is swingably supported on a platform 79 hinged to the base at a point 67 close to the lower poles of the two cores. A linkage 68, such as a rigid or flexible shaft, connects the hinge portion of platform 79 with a load here represented by a butterfly valve 40 in a duct 73 for superheated steam. The steam passes through a coil 72 in a monitoring chamber 71 containing a thermoplastic element in the form of a bimetallic strip 44 which, in response to variations in steam temperature, expands or contracts to rotate an optical shutter 45 coupled therewith. A light source 70 illuminates, through slits in that shutter, a pair of photocells 42, 43 connected in a bridge circuit together with two resistors 46, 47. The control windings 14, 15 of the electromagnetic actuator are serially connected in one bridge diagonal whereas the D-C control voltage is applied across the other diagonal. With shutter 70 in a normal position corresponding to a predetermined fluid temperature, the bridge 42, 43, 45, 46 is in balance and no current passes through control windings 14 and 15; the working current through windings 12 and 13 may then be just sufficient to saturate the bridge pieces 18, 19 to an extent keeping the mobile ferromagnetic member 39 in an intermediate position, against gravity or some other restoring force, in which the valve 40 partly throttles the flow through duct 73. When the steam temperature drops, shutter 45 is turned to increase the illumination of one photocell and to reduce that of the other photocell in such a sense as to unbalance the bridge to pass an aiding current through the control windings whereby the attraction between the two cores 38, 39 is increased to swing the core 39 and the valve 40 in a counterclockwise direction, thereby opening the duct 73 for greater fluid flow. Conversely, an increase in fluid temperature gives rise to a control current of opposite polarity and allows the swingable core 39 to swing clockwise, thereby increasing particularly the upper airgap between the cores, with resulting further throttling of duct 73. Thus, the actuator of FIG. 9 operates to maintain a substantially constant heat supply in a conduit system, such as a radiator, traversed by the steam from duct 73 and coil 72.

In FIG. 10, finally, I have illustrated a modification of the arrangement of FIG. 2, with the cores 1', 2' relatively inverted so that their poles 1S', 2N' and 1N', 2S' are spanned by diagonally intersecting bridge pieces 5, 6 which are mechanically interconnected by a nonmagnetic spacer 8'. In this case, a single control winding 14' envelops the north poles while another control winding 15' is common to the south poles of the two cores. The saturable bridge pieces 4, 5 (FIG. 2) have been omitted for the sake of clarity.

My invention, of course, admits of numerous modifications and adaptations without departing from the spirit and scope of the appended claims.

I claim:
1. In an electromagnetic actuator, in combination:
a plurality of relatively movable magnetizable members forming a substantially closed magnetic circuit with at least one airgap, said members including a pair of generally U-shaped cores with spaced-apart poles;
first and second electromagnets each including one of said cores and winding means thereon, each of said electromagnets further including a saturable bridge piece forming a magnetic short circuit across the poles of the core thereof;
circuit means for passing through said winding means an operating current generating in each of said cores a flux of variable magnitude;
and control means for amplitude-modulating said operating current to vary the magnitude of said flux between a relatively low value and a relatively high value, the latter exceeding the saturation level of said bridge pieces, whereby said relatively movable members are attracted toward each other to reduce the size of said airgap.

2. The combination defined in claim 1 wherein said circuit means comprises a source of alternating current and rectifier means in series with said source for passing alternate half-cycles of said current through the winding means of said first and second electromagnets, respectively, said control means including a supply of direct current of a magnitude substantially smaller than that of said operating current.

3. The combination defined in claim 2 wherein said circuit means further includes a capacitance substantially resonating said winding means upon saturation of said bridge pieces.

4. The combination defined in claim 2 wherein said winding means includes a first winding in series with said source and a second winding independent thereof, said supply of direct current being connectable across said second winding.

5. The combination defined in claim 1 wherein said members include a pair of armatures each spacedly bridging two opposite poles of said first and second electromagnets.

6. The combination defined in claim 5, further comprising a nonmagnetic structure rigidly interconnecting said armatures.

7. The combination defined in claim 5 wherein said armatures are a pair of concentric rings.

8. The combination defined in claim 5 wherein said armatures are axially spaced rings rotatable about a common axis.

9. The combination defined in claim 5 wherein said armatures diagonally intersect each other, said winding means including a pair of coils each wound about similarly polarized legs of both said cores.

10. The combination defined in claim 1 wherein said cores are pivotally interconnected for relative swinging about an axis adjacent two confronting poles thereof.

References Cited

UNITED STATES PATENTS

| | | | |
|---|---|---|---|
| 1,490,397 | 4/1924 | Moody | 323—90 XR |
| 750,594 | 1/1904 | Campbell | 335—298 |
| 1,721,348 | 7/1929 | Mawdsley | 323—83 XR |
| 2,755,397 | 7/1956 | Snyder et al. | 310—103 XR |
| 846,340 | 3/1907 | Newell | 317—155.5 XR |
| 2,671,502 | 3/1954 | McCabe | 317—156 XR |
| 2,028,263 | 1/1936 | Warrick | 317—156 XR |
| 3,271,703 | 9/1966 | Kaenel | 335—297 XR |

LEE T. HIX, Primary Examiner

C. L. YATES, Assistant Examiner

U.S. Cl. X.R.

323—90, 89; 317—48, 155.5; 310—103